(12) United States Patent
Shemesh et al.

(10) Patent No.: US 12,079,328 B1
(45) Date of Patent: Sep. 3, 2024

(54) TECHNIQUES FOR INSPECTING RUNNING VIRTUALIZATIONS FOR CYBERSECURITY RISKS

(71) Applicant: Wiz, Inc., New York, NY (US)

(72) Inventors: Daniel Hershko Shemesh, Givat-Shmuel (IL); Yarin Miran, Rishon Lezion (IL); Roy Reznik, Tel Aviv (IL); Ami Luttwak, Binyamina (IL); Yinon Costica, Tel Aviv (IL); Niv Roit Ben David, Tel Aviv (IL); Yaniv Shaked, Tel Aviv (IL); Raaz Herzberg, Tel Aviv (IL); Amir Lande Blau, Tel Aviv (IL)

(73) Assignee: Wiz, Inc., New York, NY (US)

( * ) Notice: Subject to any disclaimer, the term of this patent is extended or adjusted under 35 U.S.C. 154(b) by 0 days.

(21) Appl. No.: 18/484,055

(22) Filed: Oct. 10, 2023

Related U.S. Application Data

(63) Continuation-in-part of application No. 17/804,212, filed on May 26, 2022, and a continuation-in-part of application No. 17/664,508, filed on May 23, 2022.

(51) Int. Cl.
*G06F 21/53* (2013.01)
*G06F 9/455* (2018.01)

(52) U.S. Cl.
CPC .......... *G06F 21/53* (2013.01); *G06F 9/45558* (2013.01); *G06F 2009/4557* (2013.01); *G06F 2009/45587* (2013.01)

(58) Field of Classification Search
CPC ................. G06F 21/53; G06F 9/45558; G06F 2009/4557; G06F 2009/45587
See application file for complete search history.

(56) References Cited

U.S. PATENT DOCUMENTS

| | | |
|---|---|---|
| 6,910,132 B1 | 6/2005 | Bhattacharya |
| 7,627,652 B1 | 12/2009 | Commons et al. |
| 7,784,101 B2 | 8/2010 | Verbowski et al. |
| 8,200,965 B2 | 6/2012 | Fujibayashi et al. |
| 8,352,431 B1 | 1/2013 | Protopopov et al. |
| 8,412,688 B1 | 4/2013 | Armangau et al. |
| 8,413,239 B2 | 4/2013 | Sutton |
| 8,499,354 B1 | 7/2013 | Satish et al. |

(Continued)

FOREIGN PATENT DOCUMENTS

| | | |
|---|---|---|
| EP | 4160983 A1 | 4/2023 |
| EP | 4254869 A2 | 10/2023 |
| RU | 2421792 C2 | 6/2011 |

OTHER PUBLICATIONS

International Search Report, PCT/IB23/55312. ISA/US, Commissioner for Patents, Alexandria, Virginia. Dated Aug. 30, 2023.

(Continued)

*Primary Examiner* — Ayoub Alata
(74) *Attorney, Agent, or Firm* — M&B IP Analysts, LLC

(57) ABSTRACT

A system and method for inspecting a running container for a cybersecurity object in a cloud computing environment is disclosed. The method includes: generating a clone of a disk, wherein the disk is deployed in a cloud computing environment; detecting a software container on the generated clone of the disk; and inspecting the software container for a cybersecurity object, in response to determining that the container is a running container.

15 Claims, 8 Drawing Sheets

(56) References Cited

U.S. PATENT DOCUMENTS

| | | |
|---|---|---|
| 8,595,822 B2 | 11/2013 | Schrecker et al. |
| 8,701,200 B2 | 4/2014 | Naldurg et al. |
| 8,789,049 B2 | 7/2014 | Hutchins et al. |
| 8,898,481 B1 | 11/2014 | Osburn, III et al. |
| 8,914,406 B1 | 12/2014 | Haugsnes |
| 9,009,836 B1 | 4/2015 | Yarykin et al. |
| 9,119,017 B2 | 8/2015 | Sinha |
| 9,165,142 B1 | 10/2015 | Sanders et al. |
| 9,172,621 B1 | 10/2015 | Dippenaar |
| 9,330,273 B2 | 5/2016 | Khetawat et al. |
| 9,369,433 B1 | 6/2016 | Paul |
| 9,419,996 B2 | 8/2016 | Porat |
| 9,438,634 B1 | 9/2016 | Ross et al. |
| 9,467,473 B2 | 10/2016 | Jayaraman |
| 9,544,327 B1 | 1/2017 | Sharma et al. |
| 9,563,385 B1 | 2/2017 | Kowalski et al. |
| 9,569,328 B2 | 2/2017 | Pavlov et al. |
| 9,582,662 B1 | 2/2017 | Messick et al. |
| 9,607,104 B1 | 3/2017 | Turner et al. |
| 9,646,172 B1 | 5/2017 | Hahn |
| 9,661,009 B1 | 5/2017 | Karandikar et al. |
| 9,672,355 B2 | 6/2017 | Titonis et al. |
| 9,712,503 B1 | 7/2017 | Ahmed |
| 9,892,261 B2 | 2/2018 | Joram et al. |
| 10,002,247 B2 | 6/2018 | Suarez et al. |
| 10,032,032 B2 | 7/2018 | Suarez et al. |
| 10,063,445 B1 | 8/2018 | Preece |
| 10,135,826 B2 | 11/2018 | Reddy |
| 10,229,125 B2 | 3/2019 | Goodman et al. |
| 10,255,370 B2 | 4/2019 | Carpenter et al. |
| 10,360,025 B2 | 7/2019 | Foskett et al. |
| 10,412,103 B2 | 9/2019 | Haugsnes |
| 10,412,109 B2 | 9/2019 | Loureiro et al. |
| 10,459,664 B1 | 10/2019 | Dreier et al. |
| 10,503,904 B1 | 12/2019 | Singh et al. |
| 10,536,471 B1 | 1/2020 | Derbeko et al. |
| 10,540,499 B2 | 1/2020 | Wailly et al. |
| 10,552,610 B1 | 2/2020 | Vashisht et al. |
| 10,554,507 B1 | 2/2020 | Siddiqui et al. |
| 10,567,468 B2 | 2/2020 | Perlmutter |
| 10,572,226 B2 | 2/2020 | Biskup et al. |
| 10,574,675 B2 | 2/2020 | Peppe et al. |
| 10,623,386 B1 | 4/2020 | Bernat et al. |
| 10,630,642 B2 | 4/2020 | Clark et al. |
| 10,664,619 B1 | 5/2020 | Marelas |
| 10,691,636 B2 | 6/2020 | Tabaaloute et al. |
| 10,725,775 B2 | 7/2020 | Suarez et al. |
| 10,735,442 B1 | 8/2020 | Swackhamer |
| 10,791,138 B1 | 9/2020 | Siddiqui et al. |
| 10,803,188 B1 | 10/2020 | Rajput et al. |
| 10,831,898 B1 | 11/2020 | Wagner |
| 10,915,626 B2 | 2/2021 | Tang |
| 10,924,503 B1 | 2/2021 | Pereira et al. |
| 10,972,484 B1 | 4/2021 | Swackhamer |
| 10,997,293 B2 | 5/2021 | Wiest et al. |
| 11,005,860 B1 | 5/2021 | Glyer et al. |
| 11,044,118 B1 | 6/2021 | Reed et al. |
| 11,099,976 B2 | 8/2021 | Khakare et al. |
| 11,165,652 B1 | 11/2021 | Byrne |
| 11,216,563 B1 | 1/2022 | Veselov et al. |
| 11,245,730 B2 | 2/2022 | Bailey |
| 11,271,961 B1 | 3/2022 | Berger |
| 11,334,670 B2 | 5/2022 | Franco et al. |
| 11,366,897 B1 | 6/2022 | Ramanathan et al. |
| 11,388,183 B2 | 7/2022 | Hoopes et al. |
| 11,444,974 B1 | 9/2022 | Shakhzadyan |
| 11,483,317 B1 | 10/2022 | Bolignano et al. |
| 11,496,498 B2 | 11/2022 | Wright et al. |
| 11,496,519 B1 | 11/2022 | Gupta et al. |
| 11,503,063 B2 | 11/2022 | Rao |
| 11,507,672 B1 | 11/2022 | Pagnozzi et al. |
| 11,516,222 B1 | 11/2022 | Srinivasan et al. |
| 11,520,907 B1 | 12/2022 | Borowiec et al. |
| 11,546,360 B2 | 1/2023 | Woodford et al. |
| 11,556,659 B1 | 1/2023 | Kumar et al. |
| 11,558,401 B1 | 1/2023 | Vashisht et al. |
| 11,558,423 B2 | 1/2023 | Gordon et al. |
| 11,567,751 B2 | 1/2023 | Cosentino et al. |
| 11,570,090 B2 | 1/2023 | Shen et al. |
| 11,614,956 B2 | 3/2023 | Tsirkin et al. |
| 11,645,390 B2 | 5/2023 | Vijayvargiya et al. |
| 11,662,928 B2 | 5/2023 | Kumar et al. |
| 11,663,340 B2 | 5/2023 | Wu et al. |
| 11,669,386 B1 | 6/2023 | Abrol |
| 11,750,566 B1 | 9/2023 | Montilla Lugo |
| 11,757,844 B2 | 9/2023 | Xiao |
| 11,770,398 B1 | 9/2023 | Erlingsson |
| 11,792,284 B1 | 10/2023 | Nanduri |
| 11,799,874 B1 | 10/2023 | Lichtenstein et al. |
| 11,803,766 B1 | 10/2023 | Srinivasan |
| 11,841,945 B1 | 12/2023 | Fogel |
| 11,914,707 B1 | 2/2024 | Ramanathan et al. |
| 11,922,220 B2 | 3/2024 | Haghighat et al. |
| 11,936,785 B1 | 3/2024 | Shemesh et al. |
| 12,019,770 B2 | 6/2024 | Nilsson et al. |
| 2005/0283645 A1 | 12/2005 | Turner et al. |
| 2007/0174915 A1 | 7/2007 | Gribble et al. |
| 2008/0075283 A1 | 3/2008 | Takahashi |
| 2008/0221833 A1 | 9/2008 | Brown et al. |
| 2008/0320594 A1 | 12/2008 | Jiang |
| 2009/0106256 A1 | 4/2009 | Safari et al. |
| 2012/0110651 A1 | 5/2012 | Van Biljon et al. |
| 2013/0054890 A1 | 2/2013 | Desai et al. |
| 2013/0124669 A1 | 5/2013 | Anderson et al. |
| 2013/0160119 A1 | 6/2013 | Sartin |
| 2013/0160129 A1 | 6/2013 | Sartin |
| 2014/0096134 A1 | 4/2014 | Barak |
| 2014/0237537 A1 | 8/2014 | Manmohan |
| 2014/0317677 A1 | 10/2014 | Vaidya |
| 2014/0337613 A1 | 11/2014 | Martini |
| 2015/0033305 A1 | 1/2015 | Shear |
| 2015/0055647 A1 | 2/2015 | Roberts |
| 2015/0163192 A1 | 6/2015 | Jain |
| 2015/0172321 A1 | 6/2015 | Kirti et al. |
| 2015/0254364 A1 | 9/2015 | Piduri et al. |
| 2015/0304302 A1 | 10/2015 | Zhang et al. |
| 2016/0063466 A1 | 3/2016 | Sheridan et al. |
| 2016/0105454 A1 | 4/2016 | Li |
| 2016/0140352 A1 | 5/2016 | Nickolov |
| 2016/0156664 A1 | 6/2016 | Nagaratnam |
| 2016/0224600 A1 | 8/2016 | Munk |
| 2016/0366185 A1 | 12/2016 | Lee et al. |
| 2017/0026416 A1 | 1/2017 | Carpenter et al. |
| 2017/0070506 A1 | 3/2017 | Reddy |
| 2017/0104755 A1 | 4/2017 | Arregoces |
| 2017/0111384 A1 | 4/2017 | Loureiro et al. |
| 2017/0185784 A1 | 6/2017 | Madou |
| 2017/0187743 A1 | 6/2017 | Madou |
| 2017/0223024 A1 | 8/2017 | Desai |
| 2017/0237560 A1 | 8/2017 | Mueller et al. |
| 2017/0257347 A1 | 9/2017 | Yan |
| 2017/0034198 A1 | 12/2017 | Powers et al. |
| 2018/0004950 A1 | 1/2018 | Gupta et al. |
| 2018/0007087 A1 | 1/2018 | Grady et al. |
| 2018/0026995 A1 | 1/2018 | Dufour et al. |
| 2018/0027009 A1 | 1/2018 | Santos |
| 2018/0063290 A1 | 3/2018 | Yang et al. |
| 2018/0159882 A1 | 6/2018 | Brill |
| 2018/0181310 A1 | 6/2018 | Feinberg et al. |
| 2018/0234459 A1 | 8/2018 | Kung |
| 2018/0239902 A1 | 8/2018 | Godard |
| 2018/0270268 A1 | 9/2018 | Gorodissky et al. |
| 2018/0276084 A1 | 9/2018 | Mitkar et al. |
| 2018/0321993 A1 | 11/2018 | McClory |
| 2018/0359058 A1 | 12/2018 | Kurian |
| 2018/0359059 A1 | 12/2018 | Kurian |
| 2019/0068617 A1 | 2/2019 | Coleman |
| 2019/0068627 A1 | 2/2019 | Thampy |
| 2019/0104140 A1 | 4/2019 | Gordeychik et al. |
| 2019/0116111 A1 | 4/2019 | Izard et al. |
| 2019/0132350 A1 | 5/2019 | Smith et al. |
| 2019/0149604 A1* | 5/2019 | Jahr .................. G06F 16/9566 713/175 |
| 2019/0171811 A1 | 6/2019 | Daniel et al. |

(56) References Cited

U.S. PATENT DOCUMENTS

| | | |
|---|---|---|
| 2019/0191417 A1 | 6/2019 | Baldemair et al. |
| 2019/0207966 A1 | 7/2019 | Vashisht et al. |
| 2019/0245883 A1 | 8/2019 | Gorodissky et al. |
| 2019/0260764 A1 | 8/2019 | Humphrey et al. |
| 2020/0012818 A1 | 1/2020 | Levin et al. |
| 2020/0028862 A1 | 1/2020 | Lin |
| 2020/0050440 A1* | 2/2020 | Chuppala ............... G06F 8/656 |
| 2020/0082094 A1 | 3/2020 | McAllister et al. |
| 2020/0125352 A1 | 4/2020 | Kannan |
| 2020/0244678 A1 | 7/2020 | Shua |
| 2020/0244692 A1 | 7/2020 | Shua |
| 2020/0259852 A1 | 8/2020 | Wolff et al. |
| 2020/0287927 A1 | 9/2020 | Zadeh et al. |
| 2020/0320845 A1 | 10/2020 | Livny et al. |
| 2020/0336489 A1 | 10/2020 | Wuest et al. |
| 2020/0387357 A1 | 12/2020 | Mathon et al. |
| 2020/0389469 A1 | 12/2020 | Litichever et al. |
| 2020/0409741 A1 | 12/2020 | Dornemann et al. |
| 2021/0042263 A1 | 2/2021 | Zdornov et al. |
| 2021/0089662 A1 | 3/2021 | Muniswamy-Reddy et al. |
| 2021/0105304 A1 | 4/2021 | Kraning et al. |
| 2021/0149788 A1 | 5/2021 | Downie |
| 2021/0158835 A1 | 5/2021 | Hill et al. |
| 2021/0176123 A1 | 6/2021 | Plamondon |
| 2021/0203684 A1 | 7/2021 | Maor et al. |
| 2021/0211453 A1 | 7/2021 | Cooney |
| 2021/0216630 A1 | 7/2021 | Karr |
| 2021/0226812 A1 | 7/2021 | Park |
| 2021/0234889 A1 | 7/2021 | Burle et al. |
| 2021/0263802 A1 | 8/2021 | Gottemukkula et al. |
| 2021/0314342 A1 | 10/2021 | Oberg |
| 2021/0320794 A1 | 10/2021 | Auh et al. |
| 2021/0329019 A1 | 10/2021 | Shua et al. |
| 2021/0334386 A1 | 10/2021 | AlGhamdi et al. |
| 2021/0357246 A1 | 11/2021 | Kumar et al. |
| 2021/0368045 A1 | 11/2021 | Verma |
| 2021/0382995 A1 | 12/2021 | Massiglia et al. |
| 2021/0382997 A1* | 12/2021 | Yi ........................ G06F 21/577 |
| 2021/0409486 A1 | 12/2021 | Martinez |
| 2022/0012771 A1 | 1/2022 | Gustafson |
| 2022/0086173 A1 | 3/2022 | Yavo et al. |
| 2022/0131888 A1 | 4/2022 | Kanso |
| 2022/0156396 A1 | 5/2022 | Bednash et al. |
| 2022/0179964 A1 | 6/2022 | Qiao et al. |
| 2022/0182403 A1 | 6/2022 | Mistry |
| 2022/0188273 A1 | 6/2022 | Koorapati et al. |
| 2022/0197926 A1 | 6/2022 | Passey et al. |
| 2022/0215101 A1 | 7/2022 | Rioux et al. |
| 2022/0232024 A1 | 7/2022 | Kapoor |
| 2022/0263656 A1 | 8/2022 | Moore |
| 2022/0284362 A1 | 9/2022 | Bellinger et al. |
| 2022/0309166 A1 | 9/2022 | Shenoy et al. |
| 2022/0326861 A1 | 10/2022 | Shachar et al. |
| 2022/0327119 A1 | 10/2022 | Gasper et al. |
| 2022/0342690 A1 | 10/2022 | Shua |
| 2022/0342997 A1 | 10/2022 | Watanabe et al. |
| 2022/0345481 A1 | 10/2022 | Shua |
| 2022/0350931 A1 | 11/2022 | Shua |
| 2022/0357992 A1 | 11/2022 | Karpovsky |
| 2022/0374519 A1 | 11/2022 | Botelho et al. |
| 2022/0400128 A1 | 12/2022 | Kfir et al. |
| 2022/0407841 A1 | 12/2022 | Karpowicz |
| 2022/0407889 A1 | 12/2022 | Narigapalli et al. |
| 2022/0413879 A1 | 12/2022 | Passey et al. |
| 2022/0414103 A1 | 12/2022 | Upadhyay et al. |
| 2022/0417011 A1 | 12/2022 | Shua |
| 2022/0417219 A1 | 12/2022 | Sheriff |
| 2023/0007014 A1 | 1/2023 | Narayan |
| 2023/0040635 A1 | 2/2023 | Narayan |
| 2023/0075355 A1 | 3/2023 | Twigg |
| 2023/0087093 A1 | 3/2023 | Ithal et al. |
| 2023/0110080 A1 | 4/2023 | Hen |
| 2023/0123477 A1 | 4/2023 | Luttwak et al. |
| 2023/0125134 A1 | 4/2023 | Raleigh et al. |
| 2023/0134674 A1 | 5/2023 | Quinn et al. |
| 2023/0136839 A1 | 5/2023 | Sundararajan et al. |
| 2023/0164148 A1 | 5/2023 | Narayan |
| 2023/0192418 A1 | 6/2023 | Horowitz et al. |
| 2023/0208870 A1* | 6/2023 | Yellapragada .......... G06F 21/53 726/22 |
| 2023/0231867 A1 | 7/2023 | Rampura Venkatachar |
| 2023/0237068 A1 | 7/2023 | Sillifant et al. |
| 2023/0254330 A1 | 8/2023 | Singh |
| 2023/0297666 A1 | 9/2023 | Atamli et al. |
| 2023/0325814 A1 | 10/2023 | Vijayan et al. |
| 2023/0336578 A1 | 10/2023 | Lidgi et al. |
| 2024/0007492 A1 | 1/2024 | Shen et al. |
| 2024/0037229 A1 | 2/2024 | Pabon et al. |
| 2024/0045838 A1 | 2/2024 | Reiss et al. |
| 2024/0080329 A1 | 3/2024 | Reed et al. |
| 2024/0080332 A1 | 3/2024 | Ganesh et al. |

OTHER PUBLICATIONS

Microsoft Build. "Introduction to Azure managed disks". Aug. 21, 2023, https://docs.microsoft.com/en-us/azure/virtual-machines/managed-disks-overview.

Microsoft Docs. "Create a VM from a managed image". Article. Jan. 5, 2022. https://docs.microsoft.com/en-us/azure/virtual-machines/windows/create-vm-generalized-managed.

Written Opinion of the International Searching Authority, PCT/IB23/55312. ISA/US Commissioner for Patents, Alexandria, Virginia. Dated Aug. 30, 2023.

Ali Gholami; Security and Privacy of Sensitive Data in Cloud Computing: a Survey of Recent Developments; ARIX:2016; pp. 131-150.

Christos Kyrkou; Towards artificial-intelligence-based cybersecurity for robustifying automated driving systems against camera sensor attacks; IEEE 2020; pp. 476-481.

Guo, yu et al. Enabling Encrypted Rich Queries in Distributed Key-Value Stores. IEEE Transactions on Parallel and Distributed Systems, vol. 30, Issue: 6. https://ieeexplore.IEEE.org/stamp/stamp.jsp?tp=&arnumber=8567979 (Year: 2019).

Henry Hanping Feng; Anomaly Detection Using Call Stack Information; IEEE: Year:2003; pp. 1-14.

International Search Report for PCT Application No. PCT/IB2022/060940 dated Feb. 1, 2023. The International Bureau of WIPO.

International Search Report for PCT/IB2023/050848, dated May 9, 2023. International Bureau of WIPO.

International Search Report of PCT/IB2023/058074, dated Nov. 20, 2023. Searching Authority United States Patent and Trademark Office, Alexandria, Virginia.

Kumar, Anuj et al. A New Approach for Security in Cloud Data Storage for IOT Applications Using Hybrid Cryptography Technique. 2020 International Conference on Power Electronics & IoT Applications in Renewable Energy and its Control. https://ieeexplore.IEEE.org/stamp/stamp.jsp?tp=&arnumber=9087010 (Year: 2020).

Mishra, Bharati; Jena, Debasish et al. Securing Files in the Cloud. 2016 IEEE International Conference on Cloud Computing in Emerging Markets (CCEM). https://ieeexplore.IEEE.org/stamp/stamp.jsp?tp=&arnumber=7819669 (Year: 2016).

Shuvo, Arfatul Mowla et al. Storage Efficient Data Security Model for Distributed Cloud Storage. 2020 IEEE 8th R10 Humanitarian Technology Conference (R10-HTC). https://ieeexplore.IEEE.org/stamp/stamp.jsp?tp=&arnumber=9356962 (Year: 2020).

Written Opinion of the International Searching Authority for PCT Application No. PCT/IB2022/060940 dated Feb. 1, 2023. The International Bureau of WIPO.

Written Opinion of the Searching Authority for PCT/IB2023/050848, dated May 9, 2023. International Bureau of WIPO.

Written Opinion of the Searching Authority of PCT/IB2023/058074, dated Nov. 20, 2023. Searching Authority United States Patent and Trademark Office, Alexandria, Virginia.

Zhang et al. BMC Bioinformatics 2014. "On finding bicliques in bipartite graphs: a novel algorithm and its application to the integration of diverse biological data types". http://www.biomedcentral.com/1471-2105/15/110.

(56) References Cited

OTHER PUBLICATIONS

Sahil Suneja; Safe Inspection of Live Virtual Machines; IEEE; Year:2017; pp. 97-111.
Jordan, M. et al. Enabling pervasive encryption through IBM Z stack innovations. IBM Journal of Research and Development, vol. 62 Issue: 2/3, https://ieeexplore.IEEE.org/stamp/stamp.jsp?tp&arnumber=8270590 (Year: 2018).
Leibenger, Dominik et al. EncFS goes multi-user: Adding access control to an encrypted file system. 2016 IEEE Conference on Communications and Network Security (CNS). https://ieeexoplore.IEEE.org/stamp/stamp.jsp?tp=&arnumber=7860544 (Year: 2016).
Siqi Ma; Certified Copy? Understanding Security Risks of Wi-Fi Hotspot based Android Data Clone Services; ACM; Year: 2021; pp. 320-331.

* cited by examiner

TECHNIQUES FOR INSPECTING RUNNING VIRTUALIZATIONS FOR CYBERSECURITY RISKS

CROSS-REFERENCE TO RELATED APPLICATIONS

This application is a continuation-in-part of U.S. Non-Provisional patent application Ser. No. 17/664,508 filed on May 23, 2022, and of U.S. Non-Provisional patent application Ser. No. 17/804,212 filed on May 26, 2022, the contents of which are hereby incorporated by reference.

TECHNICAL FIELD

The present disclosure relates generally to the detection of cybersecurity risks in cloud computing environments, and specifically to techniques for inspecting running virtualizations for cybersecurity risks.

BACKGROUND

Cybersecurity is a field increasing in importance exponentially. As more vital functions are connected to each other and to networks around the globe, serious risk is posed when vulnerabilities are detected. Such threats may result in billions of dollars in damages, lives lost, and incapacitation of infrastructure.

Adding to that is the complexity and variety of cloud environments in which these functions, also referred to as workloads, are implemented. Traditionally, agent-based scanning was used, however, this requires active installation of agents on each workload, monitoring that the agents are indeed installed and working, and this in itself is not always effective.

Certain solutions require that a virtual appliance be placed in the cloud environment in order to scan the target workloads. Deploying a virtual appliance in the cloud environment, especially in multiple cloud environments, is not always a feasible task, especially when it comes to scale. Other solutions continuously monitor virtual workloads to detect changes therein, and alert when a change is detected. However, this requires continuous monitoring and maintaining a "base line" to which the current status of a machine can be compared to. Neither solution is particularly suited for scale, and especially not for scale across multiple cloud platforms.

Scalable solutions are important for cloud computing environments. One of the most prominent advantages of cloud computing environments is their ability to scale up and down quickly, in response to user demand for services provided by the cloud environment.

One key property of this scalability is the ability of the cloud environment to dynamically grow to temporarily accommodate copies of running assets within the environment.

Inspection of these copied assets however requires immediate attention at creation due to the rapid changes existent within cloud environments. It would therefore be advantageous to provide a solution that would overcome the challenges noted above.

SUMMARY

A summary of several example embodiments of the disclosure follows. This summary is provided for the convenience of the reader to provide a basic understanding of such embodiments and does not wholly define the breadth of the disclosure. This summary is not an extensive overview of all contemplated embodiments, and is intended to neither identify key or critical elements of all embodiments nor to delineate the scope of any or all aspects. Its sole purpose is to present some concepts of one or more embodiments in a simplified form as a prelude to the more detailed description that is presented later. For convenience, the term "some embodiments" or "certain embodiments" may be used herein to refer to a single embodiment or multiple embodiments of the disclosure.

A system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by a data processing apparatus, cause the apparatus to perform the actions.

In one general aspect, the method may include generating a clone of a disk, where the disk is deployed in a cloud computing environment. The method may also include detecting a software container on the generated clone of the disk. Method may furthermore include inspecting the software container for a cybersecurity object, in response to determining that the container is a running container. Other embodiments of this aspect include corresponding computer systems, apparatus, and computer programs recorded on one or more computer storage devices, each configured to perform the actions of the methods.

Implementations may include one or more of the following features. The method may include: inspecting the generated clone of the disk to detect the software container. The method may include: detecting the disk in the cloud computing environment, where the disk is associated with a workload. The method may include: detecting the cybersecurity object in the software container; and initiating a mitigation action in response to detecting the cybersecurity object. The method may include: detecting an image of the software container in a repository; and inspecting the image of the software container for the cybersecurity object. The method may include: initiating a second mitigation action in response to detecting the cybersecurity object on the image of the software container. The method may include: inspecting each layer of a plurality of layers of the software container for the cybersecurity object. The method where the mitigation action includes any one of: revoking access to the software container, revoking access from the software container, generating an alert, updating an alert, generating a severity score, updating a severity score, and any combination thereof. The method may include: detecting an identifier of the software container; determining a location of a repository based on the detected identifier; detecting a base image in the repository; detecting in the cloud computing environment a plurality of software containers, each software container deployed based on the base image; and initiating a mitigation action for each software container of the plurality of software containers, in response to detecting the cybersecurity object on the running container. The method may include: releasing a resource allocated to the generated clone of the disk, in response to determining that inspection is complete. Implementations of the described techniques may include hardware, a method or process, or a computer tangible medium.

In one general aspect, non-transitory computer-readable medium may include one or more instructions that, when executed by one or more processors of a device, cause the device to: generate a clone of a disk, where the disk is deployed in a cloud computing environment. The medium may furthermore detect a software container on the generated clone of the disk. The medium may in addition inspect the software container for a cybersecurity object, in response to determining that the container is a running container. Other embodiments of this aspect include corresponding computer systems, apparatus, and computer programs recorded on one or more computer storage devices, each configured to perform the actions of the methods.

In one general aspect, the system may include a processing circuitry. The system may also include a memory, the memory containing instructions that, when executed by the processing circuitry, configure the system to: generate a clone of a disk, where the disk is deployed in a cloud computing environment. The system may in addition detect a software container on the generated clone of the disk. The system may moreover inspect the software container for a cybersecurity object, in response to determining that the container is a running container. Other embodiments of this aspect include corresponding computer systems, apparatus, and computer programs recorded on one or more computer storage devices, each configured to perform the actions of the methods.

Implementations may include one or more of the following features. The system where the memory contains further instructions which when executed by the processing circuitry further configure the system to: inspect the generated clone of the disk to detect the software container. The system where the memory contains further instructions which when executed by the processing circuitry further configure the system to: detect the disk in the cloud computing environment, where the disk is associated with a workload. The system where the memory contains further instructions which when executed by the processing circuitry further configure the system to: detect the cybersecurity object in the software container; and initiate a mitigation action in response to detecting the cybersecurity object. The system where the memory contains further instructions which when executed by the processing circuitry further configure the system to: detect an image of the software container in a repository; and inspect the image of the software container for the cybersecurity object. The system where the memory contains further instructions which when executed by the processing circuitry further configure the system to: initiate a second mitigation action in response to detecting the cybersecurity object on the image of the software container. The system where the memory contains further instructions which when executed by the processing circuitry further configure the system to: inspect each layer of a plurality of layers of the software container for the cybersecurity object. The system where the mitigation action includes any one of: revoking access to the software container, revoking access from the software container, generating an alert, updating an alert, generating a severity score, updating a severity score, and any combination thereof. The system where the memory contains further instructions which when executed by the processing circuitry further configure the system to: detect an identifier of the software container; determine a location of a repository based on the detected identifier; detect a base image in the repository; detect in the cloud computing environment a plurality of software containers, each software container deployed based on the base image; and initiate a mitigation action for each software container of the plurality of software containers, in response to detecting the cybersecurity object on the running container. The system where the memory contains further instructions which when executed by the processing circuitry further configure the system to: release a resource allocated to the generated clone of the disk, in response to determining that inspection is complete. Implementations of the described techniques may include hardware, a method or process, or a computer tangible medium.

BRIEF DESCRIPTION OF THE DRAWINGS

The subject matter disclosed herein is particularly pointed out and distinctly claimed in the claims at the conclusion of the specification. The foregoing and other objects, features, and advantages of the disclosed embodiments will be apparent from the following detailed description taken in conjunction with the accompanying drawings.

DETAILED DESCRIPTION

Figure 1:
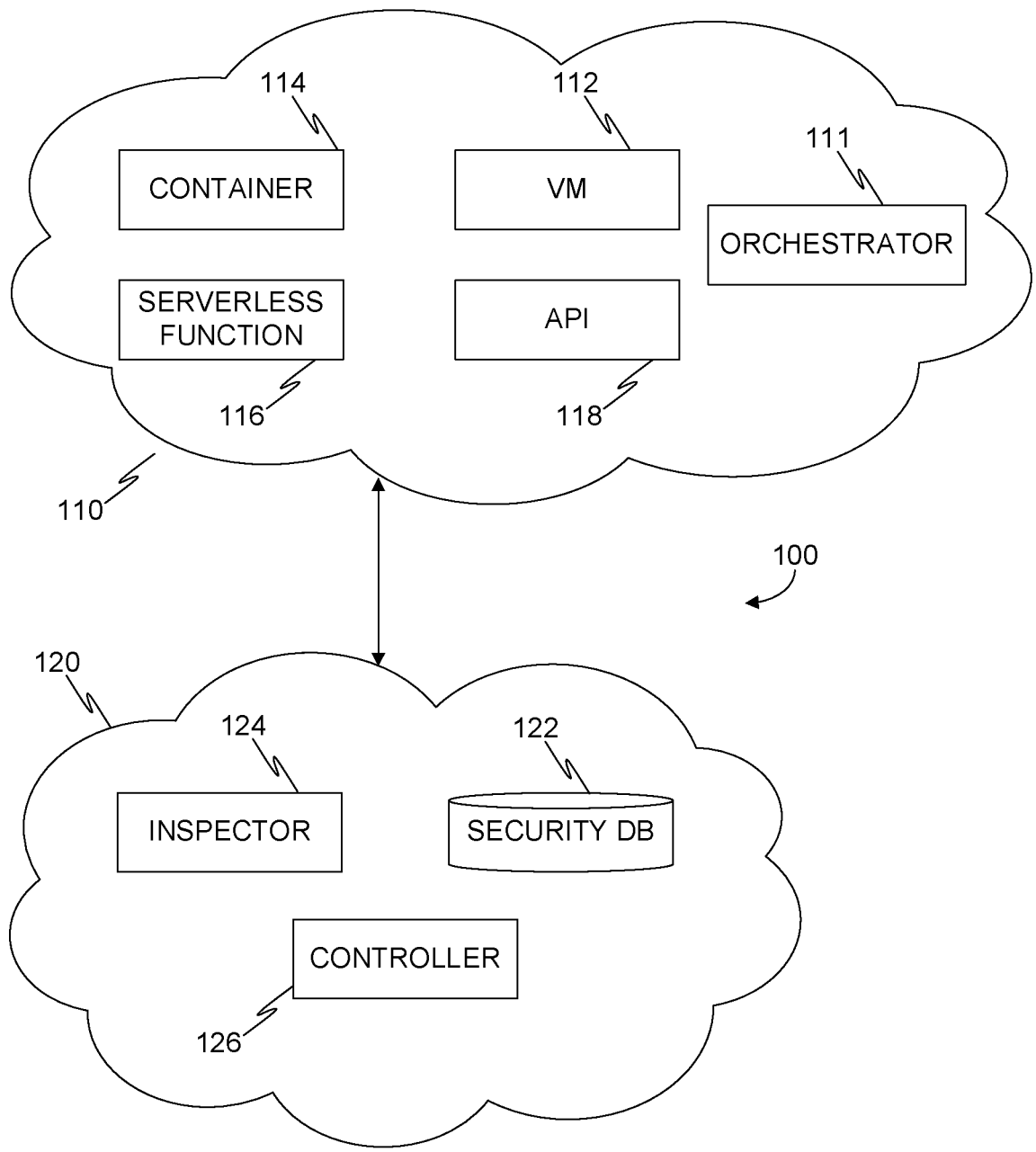
FIG. 1 is an example of a diagram of a cloud computing infrastructure, implemented in accordance with an embodiment.

It is important to note that the embodiments disclosed herein are only examples of the many advantageous uses of the innovative teachings herein. In general, statements made in the specification of the present application do not necessarily limit any of the various claimed embodiments. Moreover, some statements may apply to some inventive features but not to others. In general, unless otherwise indicated, singular elements may be in plural and vice versa with no loss of generality. In the drawings, like numerals refer to like parts through several views.

FIG. 1 is an example of a diagram of a cloud computing infrastructure 100, implemented in accordance with an embodiment. A cloud computing infrastructure 100 may be, for example, Amazon® Web Services (AWS), Google® Cloud Platform (GCP), Microsoft® Azure, Oracle® Cloud Infrastructure (OCI), and the like. In an embodiment, a plurality of cloud computing infrastructures may be utilized, each having at least one cloud computing environment deployed thereon. A cloud computing environment 110 is deployed on the cloud computing infrastructure 100. A cloud computing environment 110 may be, for example, a virtual private cloud (VPC) deployed on Azure.

The cloud computing environment 110 includes cloud entities, such as resources and principals. A resource is a cloud entity that supplies functionality, such as processing power, memory, storage, communication, and the like. A resource may supply more than one functionality. Resources may include, for example, virtual machines (VMs), such as VM 112, container engines such as container engines 114, serverless functions such as serverless functions 116, and the like. As used herein, unless otherwise noted, the terms 'resource', 'virtual instance' and 'workload' are used interchangeably. The cloud computing environment 110 may further include an application programming interface (API), through which actions in the cloud environment may be triggered. A container engine may be implemented using Kubernetes® or Docker®. A serverless function may implemented using Lambda®. A VM may be implemented using Oracle® VirtualBox, Azure Virtual Machines, and the like.

In an embodiment, an Azure VM is deployed with an operating system (OS) disk, a temporary disk, and at least one data disk. It should be noted a VM may be deployed with only an OS disk, in some embodiments. The at least one data disk is a managed disk that is attached to the VM and used to store, for example, application data, generated content, and the like. The OS disk includes a preinstalled OS and contains a boot volume. The temporary disk is an optional disk that is not managed, and is used for short-term storage, e.g., for storing a page file, a swap file, and the like. An example of a VM 112 is discussed in more detail in FIGS. 2A and 2B below.

A principal is a cloud entity that acts on a resource, meaning it can request, or otherwise initiate, actions or operations in the cloud environment which cause a resource to perform a function. A principal may be, for example, a user account, a service account, a role, and the like. In an embodiment, a principal is implemented as a data structure that includes information about an entity, such as a username, a password hash, an associated role, and the like.

The cloud computing environment 110 is connected to an inspection environment 120. The inspection environment 120 is a cloud computing environment. In an embodiment, the inspection environment 120 is deployed on the cloud computing infrastructure 100, in another cloud computing infrastructure, or a combination thereof. In certain embodiments, a portion of the inspection environment 120 is deployed in the cloud computing environment 110. In some embodiments, certain instances deployed in the inspection environment 120 may be deployed in the cloud computing environment 110.

The inspection environment 120 includes a plurality of inspector workloads, such as inspector 124. The inspector 124 is configured to inspect workloads (i.e., virtual instances) of the cloud computing environment 110. In certain embodiments, an inspector, such as inspector 124, may be configured to inspect other cloud entities, such as user accounts, and the like. In an embodiment, a storage, such as a disk of a virtual machine, may be cloned. As will be discussed below, the cloned disk may be accessed by the inspector 124. The inspector 124 may inspect the cloned disk of the workload for security objects, such as secrets, keys, user account information, and the like. In some embodiments, the inspector 124 inspects the cloned workload for applications, operating systems, binaries, libraries, and the like.

In an embodiment, a cloned disk, which may be a clone of, for example, a data disk, an OS disk, and so on, is generated by generating an instruction, which when executed by the cloud computing environment (e.g., by an orchestrator 111 of the cloud computing environment) generates a disk descriptor, based on a virtual instance descriptor (e.g., a VM descriptor). In a cloud computing environment, an orchestrator 111 is an application that configures, coordinates, and manages applications, deployments, and the like. The virtual instance descriptor includes an address where the content of the disk is stored. The address may be, for example, an address of a page in a shared storage scheme. The disk descriptor is a data structure that includes therein a data field that includes the original address from the virtual instance descriptor.

A cloned disk is instantly available for inspection, as generating the disk descriptor is an instant operation. In contrast, generating a snapshot requires copying of data, which is only available for inspection once the snapshot generation is complete. Therefore, disk cloning provides faster access to a disk for inspection, and additionally requires less computing resources for such inspection. This is advantageous as the cloning does not disturb a live virtual instance (i.e., a virtual instance deployed in a production environment) while allowing access to a data disk thereof, without requiring cloud resources other than a generation of a cloned disk descriptor. The inspection of a cloned disk is discussed in further detail below.

The inspection environment 120 further includes a security database 122, which is a graph database. A security graph may be stored on the security database 122. The security graph includes a representation of the cloud computing environment 110. For example, cloud entities of the cloud computing environment 110 may be represented each as nodes in the security graph. In an embodiment, the security graph is generated based on objects detected by an inspector, such as inspector 124. In an embodiment, a virtual instance (e.g., a virtual machine) is represented by a node stored in the security graph. A disk, such as OS disk, data disk, and the like, are also represented each by a node, which is connected to the node representing the virtual instance. In certain embodiments, generating an instruction to inspect a virtual instance further includes querying a security graph to determine an identifier of a disk that is connected to the virtual instance, by generating a query to detect a node representing a disk that is connected to another node representing the virtual instance.

A controller 126 is further included in the inspection environment 120. In an embodiment, the controller 126 is a workload deployed in the inspection environment 120 which is configured to initiate inspection of the cloud computing environment 110. For example, initiating inspection may include determining what cloud entities to inspect, when to inspect them, and the like.

Figure 2:
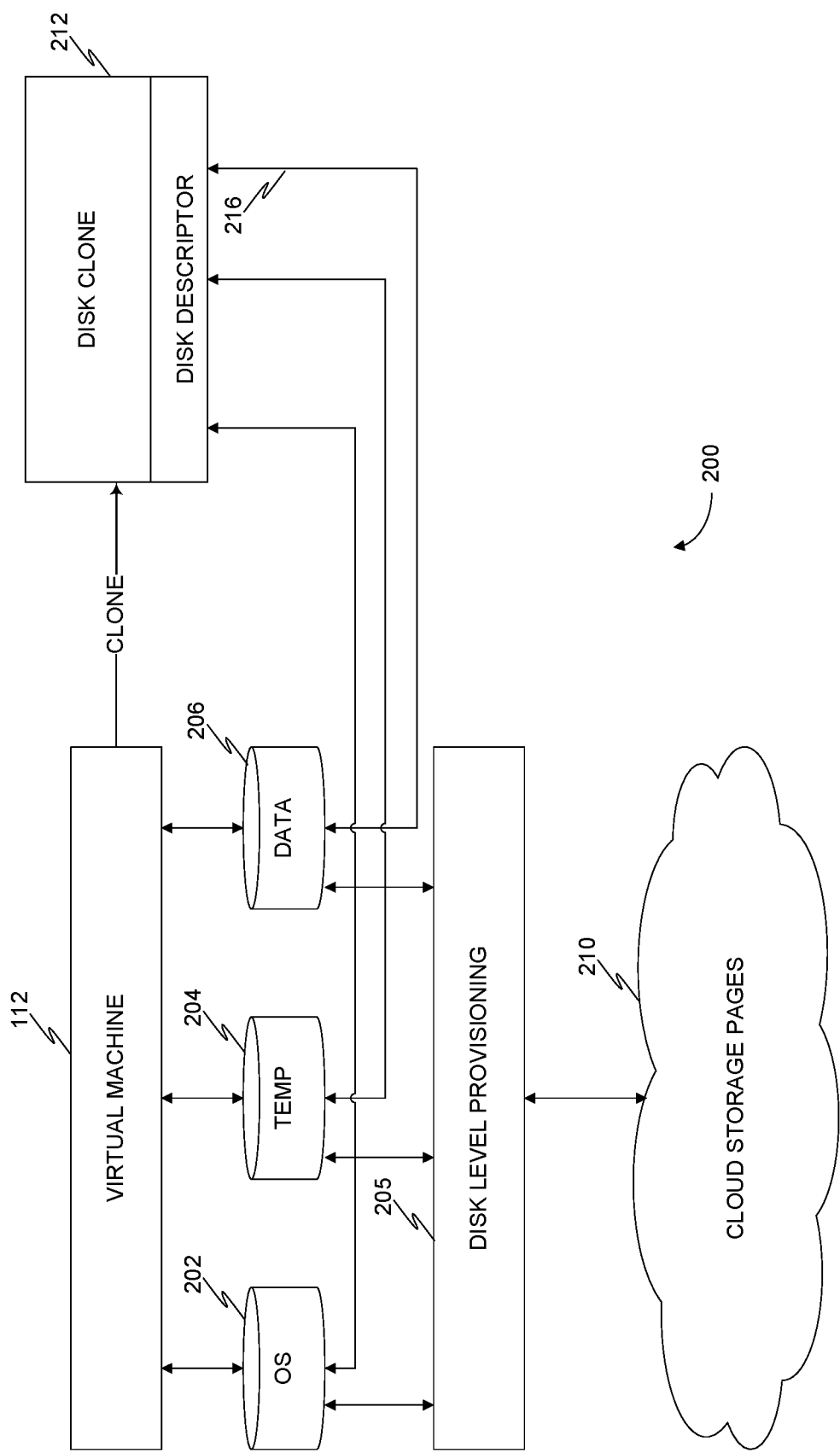
FIG. 2 is an example diagram of a virtual machine and a cloned disk thereof, utilized to describe an embodiment.

FIG. 2 is an example diagram 200 of a virtual machine 112 and a cloned disk thereof, utilized to describe an embodiment. While an Azure® cloud computing infrastructure is discussed here, it should be understood that the teachings herein apply equally to other cloud computing infrastructures that offer equal functionality. The VM 112 includes a plurality of disks allocated to the VM 112. The VM 112 may be deployed only with an OS disk, with an OS disk and a plurality of data disks, and so on.

In this example embodiment the plurality of disks includes an operating system (OS) disk 202, an optional temporary disk 204, and at least a data disk 206. The OS disk 202 includes a preinstalled OS, such as Microsoft® Windows, or Linux®. The preinstalled OS is in a boot volume of the OS disk 202. The optional temporary disk 204 may be used for storing temporary data, such as page files, swap files, and the like. The data disk 206 may be used for storing an application, application code, libraries, binaries, application data, and the like. In an embodiment, a plurality of data disks 206 may be allocated to the VM 112. In some configurations, a disk of the plurality of disks may be encrypted. For example, the OS disk 202, and the data disk 206 may be encrypted disks. In certain embodiments, an encrypted disk is associated with an encryption key which can be used to decrypt the disk. For example, a VM having a Windows® allocated disk may be configured to encrypt a data disk allocated to the VM using BitLocker. A VM having a Linux® allocated disk may be configured to encrypt a data disk allocated to the VM using DM-Crypt®.

The plurality of disks are allocated to the VM 112 by a disk-level provisioning 205. In an embodiment, the disk level provisioning 205 is an application deployed in a cloud computing infrastructure. The disk level provisioning 205 provisions hardware resources to the VM 112 which results in the allocation of a disk. The hardware resources are provisioned from cloud storage pages 210 of the cloud computing infrastructure. The hardware resources may be solid state device (SSD) storage, hard disk drive (HDD) storage, optical storage, other magnetic storage, and the like. In an example embodiment, the cloud storage pages 210 are Azure page blobs. A page blob is a collection of pages, each page having a predetermined size. For example, the predetermined size may be 512 bytes per page.

A disk clone 212 (also referred to as cloned disk 212) includes a disk descriptor which includes a reference to an address of a disk of the VM 112. In certain cloud computing infrastructures, when a disk is cloned, a pointer, such as a pointer 216 is used to point to an original disk, in this example the data disk 206. In an embodiment, this may be achieved by dereferencing a pointer of the VM 112 which points to the data disk 206, and generating the pointer 216 for the cloned VM 212 to point to the data disk 206. In certain embodiments where a disk is encrypted, a pointer may be generated for the cloned VM 212 to the encryption key.

In an embodiment, the cloning process generates the disk clone 212 as a background process. This is possible due to utilizing diffs. A diff is an additional content that includes the difference between a content at one point in time (e.g., when the original disk was cloned) and a second, later, point in time. Thus, the VM 112 may access the data disk 206 and any diffs generated, or committed, after the disk clone 212 is generated, whereas the disk clone 212 may access only the content of the original data disk 206, and cannot access any diffs generated since.

The cloned disk 212 may then be inspected by an inspector, such as the inspector 124 of the inspection environment 120 of FIG. 1 above. In some embodiments, a cloud computing infrastructure may be divided into regions, corresponding to geographic regions. In such embodiments, cloning a disk may be possible only if the disk clone is in the same region as the original disk from which the clone is generated. In an embodiment, an inspection controller, such as the controller 126 of FIG. 1, may determine if inspecting a virtual instance requires generating a disk clone or a snapshot. In an embodiment, the determination is performed based on the geographic location of the VM 112, an intended geographic location into which a disk of the VM 112 is cloned, a geographic location of the inspection environment, a number of disks allocated to the virtual instance, or any combination thereof.

By inspecting a cloned disk 212 there is no need to generate a snapshot, which prevents at least some of the deficiencies noted above. Furthermore, cloning is performed on a live virtual instance, which remains live during inspection, as the cloning does not interfere with the virtual instance's operation. Once inspection of the cloned disk 212 is complete, the cloned disk 212 may be spun down, releasing any resources allocated to it, and removing the pointers pointing to the disks of the virtual machine. In an embodiment, the cloned disk 212 may be deleted to accomplish spinning down.

Figure 3:
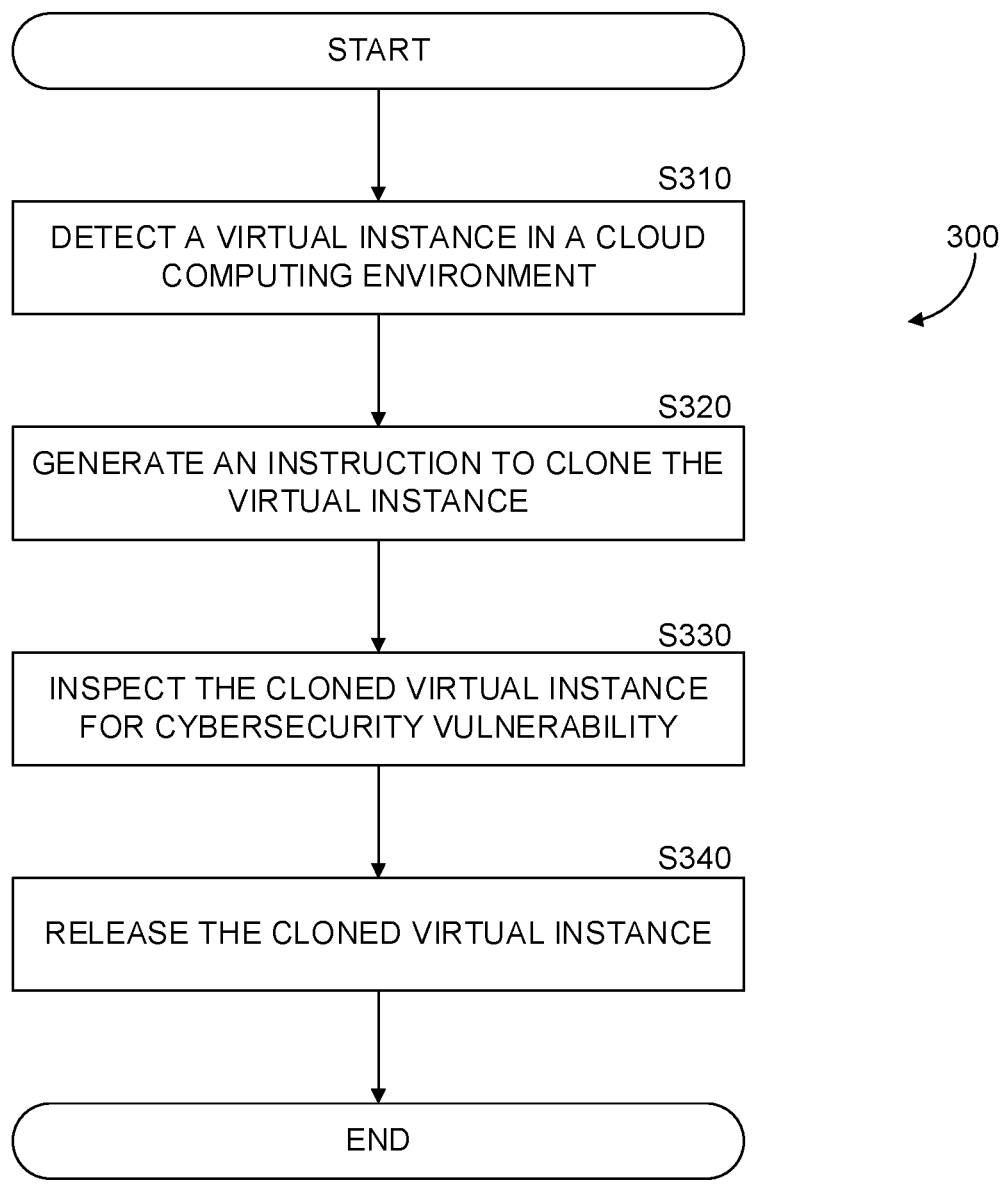
FIG. 3 is an example flowchart of a method for generating a disk clone of a virtual instance for vulnerability inspection according to an embodiment.

FIG. 3 is an example flowchart 300 of a method for generating a disk clone of a virtual instance for vulnerability inspection according to an embodiment.

At S310, a live virtual instance is detected in a cloud computing environment. A live virtual instance is a virtual instance which, at the time of detection, is deployed in a production environment. A production environment is a cloud computing environment that provides services and resources, for example, to users of the cloud computing environment. This is an environment that is distinct, for example, from a test environment in which applications, appliances, code, and the like, are tested, before being deployed in a production environment for general use.

In an embodiment, an application programming interface (API) of a cloud computing environment may be queried to detect virtual instances deployed therein. In other embodiments, a security graph may be queried to detect virtual instances deployed in cloud computing environments. The security graph, which includes a representation of the cloud computing environment, may be queried to detect virtual instances based on at least an attribute. The at least an attribute may be, for example, a type of virtual instance (e.g., virtual machine, container, etc.), a region in which the virtual instance is deployed, a tag indicating that the virtual instance should be inspected, and the like.

In an embodiment, detecting a virtual instance further includes determining an identifier of the virtual instance, such as a name, network address, and the like. The identifier may be used to access the virtual instance. The virtual instance includes a disk (also referred to as an original disk). In some embodiments, the disk is represented as a node in the security graph, the node connected to another node, the another node representing the virtual instance.

In certain embodiments, detecting a live virtual instance includes receiving an identifier of the live virtual instance, and an instruction to inspect the live virtual instance.

At S320, an instruction is generated which, when executed, configures the cloud computing environment to clone the disk of the virtual instance. In an embodiment, the instruction is generated for execution by an orchestrator of the cloud computing environment in which the virtual instance, also called a parent virtual instance, is deployed. When executed, the instruction configures, for example, the cloud computing environment, to allocate resources to a cloned disk. The cloned disk is an independent copy of the original disk of the parent virtual instance. An independent copy of a disk is a copy that can be deployed and accessed independently of the original disk. This is as opposed to a copy of a virtual instance, such as a snapshot, which requires additional resources allocated in order to deploy.

For example, a snapshot may be generated based on a single disk of a virtual instance. A new disk (e.g., persistent volume) may be generated based on the snapshot, and a claim (e.g., persistent volume claim) generated to another virtual instance in order to access data stored on the new disk. Furthermore, a snapshot is only available once the disk is completely copied. In contrast, a clone is available immediately as the operation of generating a disk descriptor is faster than the operation of generating a snapshot. For at least this reason inspection is completed faster.

In certain embodiments, the instruction, when executed, configures the cloud computing environment to generate a cloned disk having a reference, such as a pointer, to the original disk of the parent virtual instance. In some embodiments, the disk is encrypted with an encryption key. The encryption key, as well as the disk, may be dereferenced. Dereferencing an encryption key (or a disk) may include determining where a pointer of the parent virtual instance is pointing to, e.g., the pointer points to a block address of a managed block storage. A new pointer may be stored for the cloned disk which points to the same block address, encryption key, etc. as the dereferenced pointer.

In some embodiments, an optional check is performed to determine if the cloned disk is configured to be deployed in the same region as the parent virtual instance. A cloud computing infrastructure may limit the ability to clone a disk outside of a region. For example, if an inspection environment is not in the same region as the cloud computing environment in which the virtual instance is inspected, it may not be possible (i.e., not permissible) to generate a disk clone in the region where the inspection environment is.

In other embodiments, an optional check may be performed to determine the number of disks associated with a virtual instance. For example, if the number of disks equals or exceeds a predetermined threshold the cloning process may be initiated, otherwise a snapshot is generated, and inspection is performed on the generated snapshot.

At S330, the cloned disk is inspected for cybersecurity threats. In an embodiment, cybersecurity threats include, but are not limited to, exposures, vulnerabilities, malware, ransomware, spyware, bots, weak passwords, exposed passwords, exposed certificates, outdated certificates, misconfigurations, suspicious events, and the like.

Inspecting a cloned disk includes, in an embodiment, assigning an inspector to the cloned disk. In some embodiments, an inspector, such as inspector 124 of FIG. 1, is provided with access to the cloned disk. For example, the cloning process may include generating an instruction which when executed configures the cloned disk to allow an inspector workload access thereto. The inspector may inspect the cloned disk for security objects, such as files, folders, and the like. A security object may be, for example, a password stored in plaintext, a password stored in cleartext, a certificate, and the like.

For example, in an embodiment, a signature for a file, folder, and the like is generated during an inspection. Such a signature is matched to another known signature. The known signature indicates a vulnerability. A signature may be generated, for example, using a checksum.

At S340, the cloned disk is released. In an embodiment, an instruction may be generated which, when executed, configures the cloud computing environment to release the cloned disk. Releasing a cloned disk may include, for example, deprovisioning resources allocated to the cloned disk. For example, a cloned disk may be deleted. Releasing the cloned disk is performed in response to completing the inspection.

While virtual machines are discussed throughout this disclosure, it should be understood that the teachings herein apply equally to other virtual instances with respect to cloning and snapshot generation.

Figure 4:
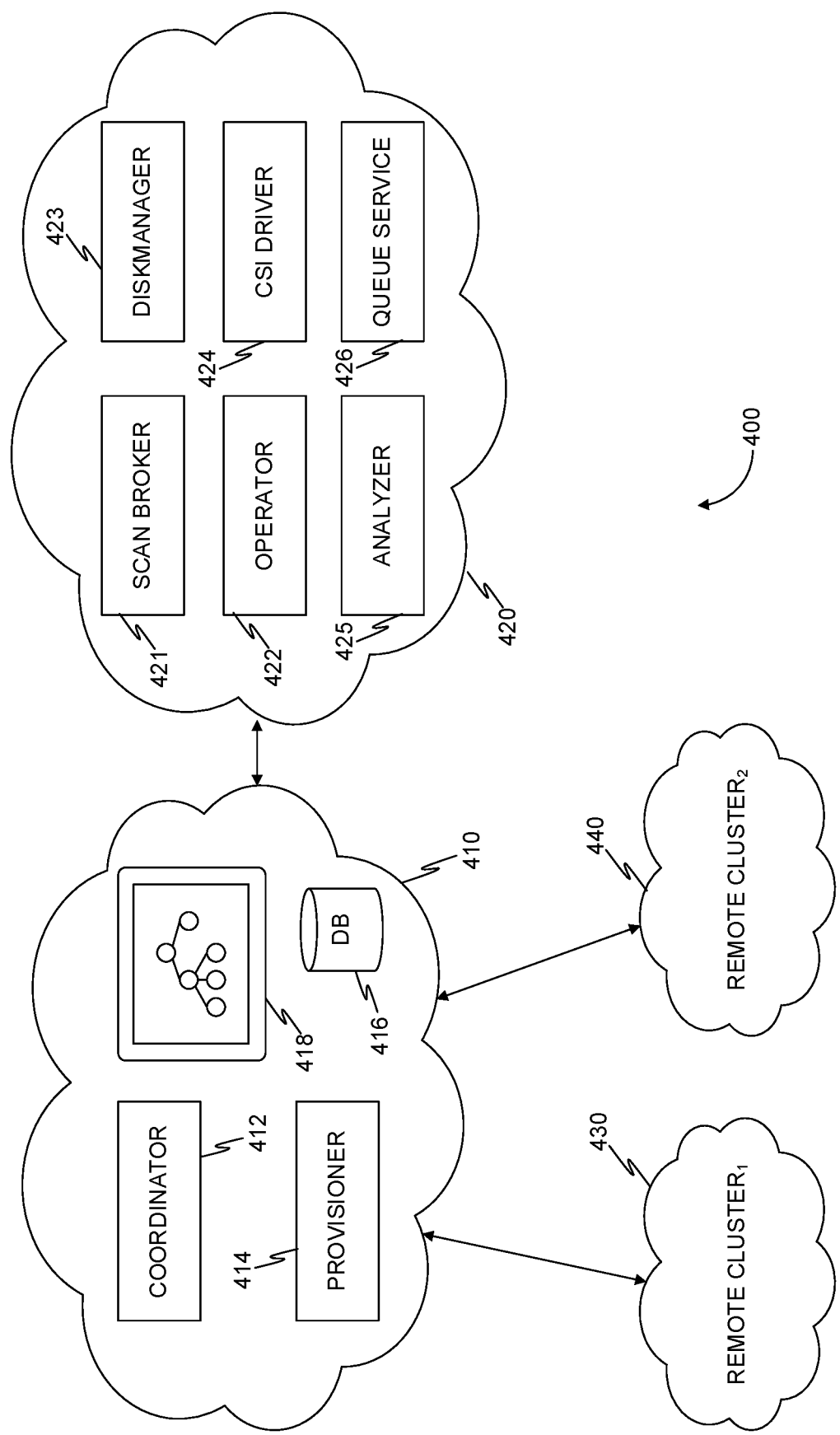
FIG. 4 is a schematic illustration of a multi-tenant inspection architecture utilizing a container orchestration system, implemented in accordance with an embodiment.

FIG. 4 is a schematic illustration of a multi-tenant inspection architecture 400 utilizing a container orchestration system, implemented in accordance with an embodiment. The architecture 400 includes a local cluster 410, a remote inspection cluster 420, and may optionally include one or more remote clusters, such as a first remote cluster 430 and a second remote cluster 440. In some embodiments, the architecture 400 may further include a remote cloud environment on which workloads such as containers, virtual machines and serverless functions are deployed.

A cluster (such as any of the clusters 410, 420, 430, and 440) may be provisioned with one or more physical machines for executing containerized applications. A cluster includes at least one machine that may execute one or more containers, and a control plane for controlling nodes (e.g., deploying new nodes) and communicating with an API of the cloud environment in which the cluster operates. For example, a Kubernetes® engine (container engine) running in an Amazon® Web Services (AWS) cloud environment may utilize an API of the control plane to communicate with a cloud control manager, which in turn communicates with a cloud provider API, in this case, AWS API. Clusters may be in the same cloud environment, different cloud environments, or some may be in a first cloud environment while others are in a second cloud environment. A cloud environment may be, for example, AWS, Microsoft® Azure, or Google® Cloud Platform (GCP).

The local cluster 410 includes a coordinator 412 and a provisioner 414. The coordinator 412 and provisioner 414 may be implemented as workloads in the cloud environment, for example as applications each running on a software container. The local cluster 410 further includes a database 416 and a graph store 418. The database 416 may include a table in which data is stored to identify workloads in the local cluster 410, in any of the remote clusters, or a combination thereof. The table may include, for each workload, a name in a namespace, a local network address, a global network address, and an indicator (such as a flag) if the workload should be scanned or not.

The graph store 418 may be used to store a security graph. A security graph may have a plurality of nodes, each node corresponding to a principal (such as a user account, service account, user group, role, etc.), or a resource (such as a VM, container, serverless function, and the like), and one or more connections (vertices) between a principal and a resource. The security graph may be used to represent each element of a cloud environment that is associated with the local cluster 410, enrichments generated based on information received from the cloud environment, enrichments based on inspection of the contents of a workload, or a combination thereof.

A coordinator 412 is a microservice that initiates inspection of workloads. The coordinator 412 may initiate inspection periodically, at predefined times, in response to user requests, or any combination thereof. The coordinator 412 may query the database 416 to determine what workloads should be inspected or otherwise scanned. The database 416 may generate responses including a list of workloads, such as virtual machines, containers, serverless functions, and the like, which should be inspected. One or more of the workloads to be inspected may be implemented, for example, the remote inspection cluster 420, in a first remote cluster 430, second remote cluster 440, or any combination thereof.

The coordinator 412 is configured to send a request to a provisioner 414 microservice, for data pertaining to one or more remote clusters, such as remote cluster 430 or remote cluster 440. The provisioner 414 can locate and direct the coordinator 412 to workloads on remote clusters. If a cluster is not deployed, the provisioner 414 can provision the cluster. For example, the coordinator 412 is configured to determine that a first workload should be inspected, in this example, the workload is a virtual machine having a first volume. A node corresponding to the workload should be deployed in a remote cluster, and a second volume, generated from a snapshot of the first volume, should be attached thereto. In an embodiment, a node may be assigned a plurality of second volumes. The second volume is generated in order to inspect the content of the first volume, without interrupting production (i.e., operation of the first volume). However, if the cluster of the node does not exist, the provisioner 414 is configured to provision a remote cluster (such as the second remote cluster 420), which in turn deploys a node to which the second volume, generated from a snapshot of the first volume, can be mounted.

The coordinator 412 is configured to generate an inspection message for the workloads that should be inspected. For example, the coordinator 412 may generate an inspection message indicating that a workload 445 in the second remote cluster 440 should be inspected. The workload may be, for example, a virtual machine, container, or serverless function. An inspection message may be generated for each workload, or for a group of workloads. The inspection message is sent to a queue of a queue service in the remote inspection cluster 420. The queue service may be implemented differently in various cloud environments. For example, Simple Queue Service (SQS) in AWS, Service Bus in Azure, and Pub/Sub in Google Cloud.

The remote inspection cluster 420 includes an inspection broker 421, an operator 422, a disk manager 423, a Container Storage Interface (CSI) driver 424, an analyzer 425, and a queue service 426. The queue service 426 is configured to receive inspection messages from the coordinator 412. An inspection message may include an address, name, and the like of a workload that should be inspected.

The inspection broker 421 is configured to receive the inspection messages. The inspection broker 421 is configured to send an instruction to the operator 422, which generates at least a disk scan custom resource for each inspection message. While this implementation utilizes an inspection broker 421, it is apparent that other approaches may be used to alert the operator 422 that a disk scan resource requires handling.

The disk manager 423 is configured to generate a volume for a scannable container. This may be achieved by accessing a virtual workload that is designated as to be inspected, generating a snapshot of each volume attached to the virtual workload, generating a volume in a remote cluster (such as remote cluster 430) based on the snapshot, and mounting the volume to a container in a cluster, the cluster provisioned by the provisioner 414. The disk manager 423 is configured to send a message to the operator 422 with an identifier, such as a volume ID, for the volume that the disk manager 423 generated. The operator 422 is further configured to generate a persistent volume (PV) for the generated volume.

In an embodiment, the CSI driver 424 can attach the generated PV, or a plurality of PVs, to a node that is assigned for inspecting, and mount the PV on the node. In some embodiments, the operator 422 may generate an analyzer 425, which is a pod that inspects the disk. The analyzer 425 may have a persistent volume claim (PVC) to the PV of the volume which needs to be inspected.

The analyzer 425 (also referred to as an inspector, or inspector workload) may then inspect for one or more object types, such as secrets, nested workloads (e.g., workloads deployed within workloads), applications, certificates, policies, and the like. The analyzer 425 may send a message with an inspection result to the operator 422. The inspection result may include objects that are discovered, metadata pertaining to the discovered objects, object identifiers, and the like.

The operator 422 sends the inspection result to the local cluster 410, and the scan result is used to update the security graph 418. Updating the security graph 418 may include generating nodes and vertices that correspond to objects discovered by the analyzer 425. The generation of a security graph is discussed in more detail in U.S. Non-Provisional patent application Ser. No. 17/524,410, the contents of which are incorporated by reference herein.

In an embodiment, the remote inspection cluster 420 may be implemented in a cloud environment in which workloads are implemented for inspecting. In some embodiments, the remote inspection cluster 420 may be implemented in the same cloud environment as the local cluster 410. It should be apparent that while a single remote inspection cluster 420 is illustrated here, this is merely for pedagogical purposes, and a plurality of remote inspection clusters may each communicate with the local cluster 410. In such embodiments, a security graph may be generated based on a shared data schema for each of the remote scanning clusters.

The architecture described above is based on container technology and provides a solution that scales together with the cloud environment, or multiple cloud environments. The solution provides for multitenancy since the remote scanning cluster can be used to scan workloads for different clients. For example, a first client may have workloads deployed in a first cloud environment and a second client may have workloads deployed in a second cloud environment. Remote clusters in which scannable containers are deployed may be spun up or down depending on real-time demand. Thus the solution is also cost effective as resources are provisioned on the fly and only paid for when in actual use. This is a clear advantage over solutions that require, for example, multiple scanner appliances that are constantly deployed in a cloud environment.

Figure 5:
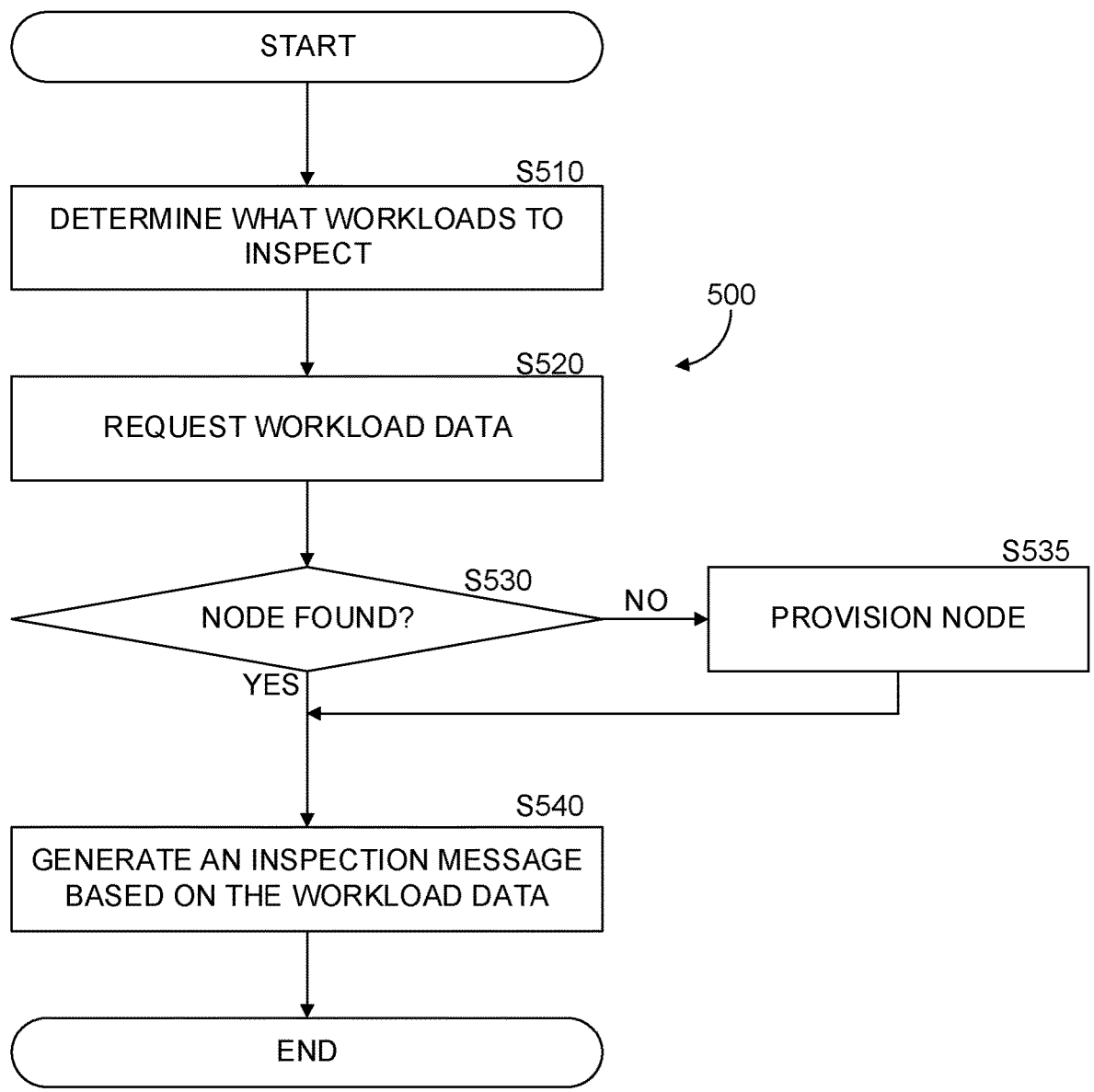
FIG. 5 is an example flowchart of a method for provisioning resources in a remote cluster, implemented in accordance with an embodiment.

FIG. 5 is an example flowchart 500 of a method for provisioning resources in a remote cluster, implemented in accordance with an embodiment.

At S510, a check is performed to determine what workload(s) should be inspected. In an embodiment, a coordinator, such as the coordinator 412 of FIG. 4, determines what workloads should be inspected. A coordinator may be implemented as a microservice in a container environment The workloads may be deployed in a local cloud environment, remote cloud environment, on-premises (on-prem) network environment, local cluster, remote cluster, or any combination thereof. Determining what workloads require inspection may include querying a database containing a table of workload identifiers, network addresses, names in a namespace, and the like, all used to identify a unique workload in a network environment. The query result returned may include workloads such as virtual machines, containers, serverless functions, and the like.

At S520, workload data for each of the determined workloads is requested. In an embodiment, a coordinate may request the workload data from the provisioner. The provisioner may store the workload data, for example in the database where the workload identifiers are stored. The provisioner may further store a list of remote clusters. A remote cluster may include at least a container for analyzing a workload. Analyzing a workload includes generating a snapshot of a volume of the workload, generating a node in a remote cluster, generating a new volume based on the snapshot of the volume, and mounting the new volume on the node.

At S530, a check is performed to determine if a remote cluster exists on which there is a node that may be dedicated to inspecting a determined workload. In an embodiment, the check may be performed by the provisioner which may further check for each determined workload if there is a dedicated node, one or more nodes for each workload, one or more workloads for each node, or any combination thereof. If 'yes' execution continues at S540, otherwise, execution continues at S535.

At S535, a remote cluster is provisioned in response to determining that a remote cluster does not exist for a workload for which a determination has been made that the workload requires inspection. The remote cluster may deploy a node for inspecting by instructing the control plane of the cluster to deploy a node. In an embodiment, each remote cluster may auto-scale and be self-managing.

At S540, an inspection message is generated based on the received workload data. In an embodiment, the workload data is received from the provisioner. The inspection message is sent to the remote cluster on which a node is deployed dedicated to inspecting the workload.

Figure 6:
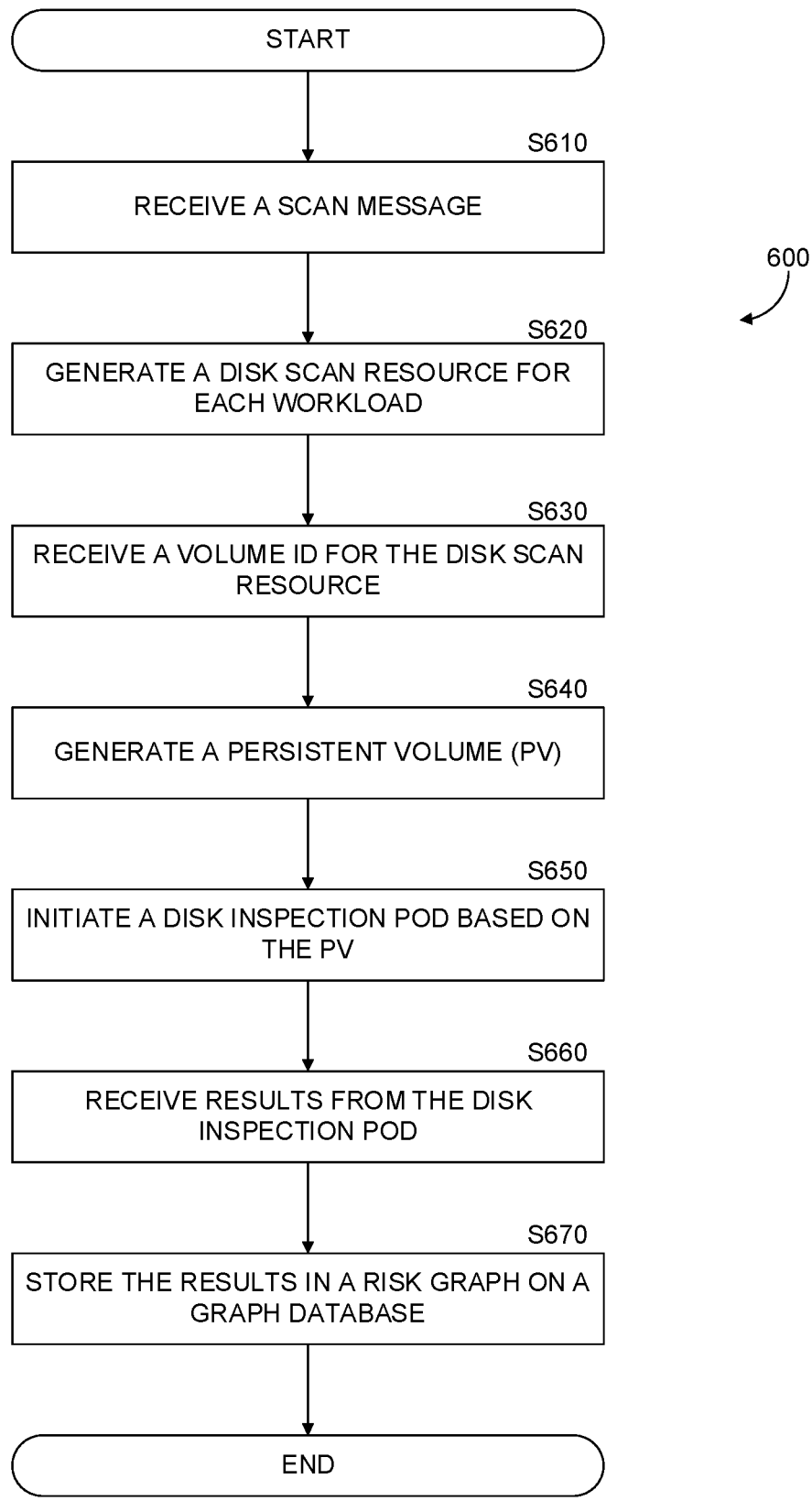
FIG. 6 is an example flowchart of a method for analyzing a workload in a remote cluster, implemented in accordance with an embodiment.

FIG. 6 is an example flowchart 600 of a method for analyzing a workload in a remote cluster, implemented in accordance with an embodiment. In an embodiment, the method is performed by the remote inspection cluster 420.

At S610, an inspection message is received. The inspection message may be generated by a coordinator, such as described in FIG. 5 above. The inspection message may include an identifier of a node on a remote cluster and an identifier of a workload for inspecting the contents thereof.

At S620, a disk scan resource is generated. A notification may be generated by a scan broker and received by the operator to indicate that a disk scan resource should be generated. A disk scan resource may be implemented as a storage resource in a cluster. In an embodiment, the disk scan resource is generated by a disk manager service. A disk manager service may provision physical storage resources as virtual storage devices, in order to generate a disk scan resource, which may include one or more such virtual storage devices.

At S630, a volume identifier (ID) is generated for each disk generated for the disk scan resource. A generated disk may be based on a snapshot from a volume of a workload. The volume identifier may be sent to the operator, for example, by a disk manager service.

At S640, a persistent volume (PV) for the generated disk is generated. In an embodiment, the PV may be generated by the operator. A persistent volume is a storage resource that is provisioned in a cluster. Optionally, a CSI driver, implemented as a microservice in each different cloud environment, attaches the PV to the node used for inspection, and mounts the PV on the node.

At S650, a pod is generated for disk inspection, with a persistent volume claim (PVC) on the PV. The PVC is a request to access a storage resource. A pod is a set of containers running on a cluster. For example, each container of the inspection pod may include an inspection application that inspects a workload for different types of objects, such as secrets, policies, applications, nested workloads, and the like.

At S660, results from the disk inspection pod are received. Results may be received as objects, which may be used to generate vertices for a graph database. Objects may also be files, such as text files, containing passwords, certificates, and other information used for authenticating network communication, and the like.

At S670, at least a portion of the received results are stored in a graph database containing a security graph. Storing results may include generating a node in the security graph, wherein the node is generated based on a predefined schema of the security graph. In other embodiments storing results may include generating a vertex connecting a first node to a second node.

Figure 7:
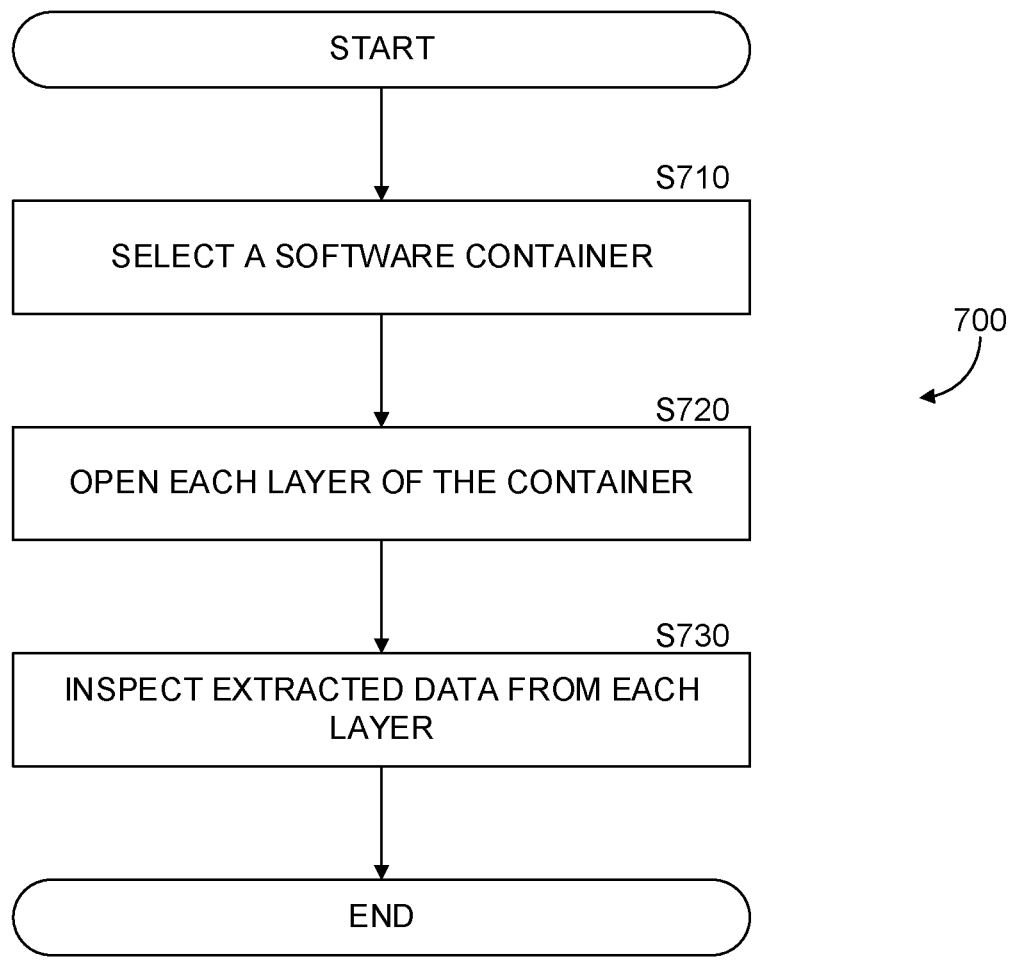
FIG. 7 is an example flowchart of a method for inspecting a software container deployed in a cloud computing environment by extracting data utilizing a unifying extractor, and implemented in accordance with an embodiment.

FIG. 7 is an example flowchart 700 of a method for inspecting a software container deployed in a cloud computing environment by extracting data utilizing a unifying extractor, and implemented in accordance with an embodiment. In an embodiment, the method is performed by a unifying extractor.

At S710, a software container (or simply 'container') deployed in a cloud computing environment is selected. In some embodiments, a container is selected by accessing a container image repository. An image file is accessed from the container image repository, from which the deployed container is deployed. A second container, which is not the container deployed in the cloud computing environment, is generated from the image file. The contents of the image file may then be written (or dumped) to a disk in a cloud computing environment of the unifying extractor.

In certain embodiments, a container may be detected on a virtual machine. For example, an inspector may be configured to detect containers (e.g., detect files that indicate that a machine has container software installed thereon). In an embodiment, an inspector is configured to detect a container on a disk of a virtual machine. The inspector may detect, for example, a file including data describing the container, and layers of which the container is comprised. A container may include an image of a read/write layer on top of a plurality of read-only layers. Each read-only layer is generated based on one or more commands executed during the container image build. A layer may be stored as a file.

At S720, each layer of the software container is opened. In an embodiment, each layer is accessed (i.e., opened) according to order. A container will typically contain a plurality of layers. The top layer (i.e., the first layer which is accessible) is a read/write layer underneath which there may be a plurality of read-only layers. In an embodiment, opening a container includes accessing a first layer, extracting all data stored in the first layer, accessing the next layer, extracting all data stored in the next layer, and so on, until all layers are opened.

At S730, the container layers are inspected. The container layers may each include extracted data. In an embodiment, data is extracted from each layer into a disk of an abstraction layer. For example, the extracted data may be stored in the abstraction layer based on a predefined data schema. The stored extracted data may be accessed by an inspector which inspects the extracted data for a target object.

Figure 8:
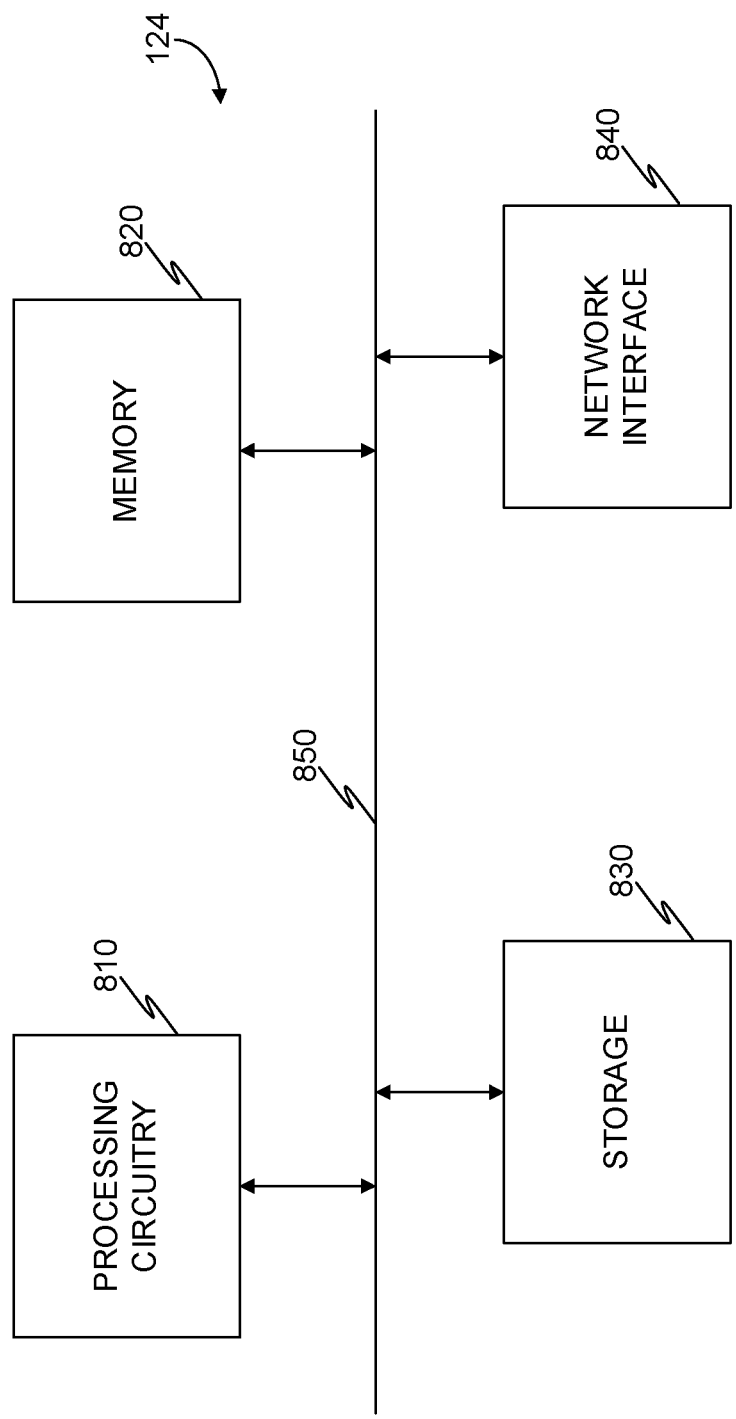
FIG. 8 is an example schematic diagram of an inspector according to an embodiment.

FIG. 8 is an example schematic diagram of an inspector 124 according to an embodiment. The inspector 124 includes a processing circuitry 810 coupled to a memory 820, a storage 830, and a network interface 840. In an embodiment, the components of the inspector 124 may be communicatively connected via a bus 850.

The processing circuitry 810 may be realized as one or more hardware logic components and circuits. For example, and without limitation, illustrative types of hardware logic components that can be used include field programmable gate arrays (FPGAs), application-specific integrated circuits (ASICs), Application-specific standard products (ASSPs), system-on-a-chip systems (SOCs), graphics processing units (GPUs), tensor processing units (TPUs), general-purpose microprocessors, microcontrollers, digital signal processors (DSPs), and the like, or any other hardware logic components that can perform calculations or other manipulations of information.

The memory 820 may be volatile (e.g., random access memory, etc.), non-volatile (e.g., read-only memory, flash memory, etc.), or a combination thereof. In an embodiment, the memory 820 is an on-chip memory, an off-chip memory, a combination thereof, and the like. In certain embodiments, the memory 820 is a scratch-pad memory for the processing circuitry 810.

In one configuration, software for implementing one or more embodiments disclosed herein may be stored in the storage 830, in the memory 820, in a combination thereof, and the like. Software shall be construed broadly to mean any type of instructions, whether referred to as software, firmware, middleware, microcode, hardware description language, or otherwise. Instructions may include code (e.g., in source code format, binary code format, executable code format, or any other suitable format of code). The instructions, when executed by the processing circuitry 810, cause the processing circuitry 810 to perform the various processes described herein.

The storage 830 is a magnetic storage, an optical storage, a solid-state storage, a combination thereof, and the like, and is realized, according to an embodiment, as a flash memory, as a hard-disk drive, or other memory technology, or any other medium which can be used to store the desired information.

The network interface 840 is configured to provide the inspector 124 with communication with, for example, the security database 122, the controller 126, and the like.

It should be understood that the embodiments described herein are not limited to the specific architecture illustrated in FIG. 8, and other architectures may be equally used without departing from the scope of the disclosed embodiments.

Furthermore, in certain embodiments the other system may be implemented with the architecture illustrated in FIG. 8. In other embodiments, other architectures may be equally used without departing from the scope of the disclosed embodiments.

The various embodiments disclosed herein can be implemented as hardware, firmware, software, or any combination thereof. Moreover, the software is preferably implemented as an application program tangibly embodied on a program storage unit or computer-readable medium consisting of parts, or of certain devices and/or a combination of devices. The application program may be uploaded to, and executed by, a machine comprising any suitable architecture. Preferably, the machine is implemented on a computer platform having hardware such as one or more central processing units ("CPUs"), a memory, and input/output interfaces. The computer platform may also include an operating system and microinstruction code. The various processes and functions described herein may be either part of the microinstruction code or part of the application program, or any combination thereof, which may be executed by a CPU, whether or not such a computer or processor is explicitly shown. In addition, various other peripheral units may be connected to the computer platform such as an additional data storage unit and a printing unit. Furthermore, a non-transitory computer-readable medium is any computer-readable medium except for a transitory propagating signal.

All examples and conditional language recited herein are intended for pedagogical purposes to aid the reader in understanding the principles of the disclosed embodiment and the concepts contributed by the inventor to furthering the art, and are to be construed as being without limitation to such specifically recited examples and conditions. Moreover, all statements herein reciting principles, aspects, and embodiments of the disclosed embodiments, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

It should be understood that any reference to an element herein using a designation such as "first," "second," and so forth does not generally limit the quantity or order of those elements. Rather, these designations are generally used herein as a convenient method of distinguishing between two or more elements or instances of an element. Thus, a reference to the first and second elements does not mean that only two elements may be employed there or that the first element must precede the second element in some manner. Also, unless stated otherwise, a set of elements comprises one or more elements.

As used herein, the phrase "at least one of" followed by a listing of items means that any of the listed items can be utilized individually, or any combination of two or more of the listed items can be utilized. For example, if a system is described as including "at least one of A, B, and C," the system can include A alone; B alone; C alone; 2A; 2B; 2C; 3A; A and B in combination; B and C in combination; A and C in combination; A, B, and C in combination; 2A and C in combination; A, 3B, and 2C in combination; and the like.

What is claimed is:

1. A method for inspecting a running container for a cybersecurity object in a cloud computing environment, comprising:
   generating a clone of a disk, wherein the disk is deployed in a cloud computing environment, wherein the disk comprises a base image;
   detecting a first software container identifier of a first software container on the generated cloned disk, wherein the first software container is a running container;
   determining a location of a software container repository based on the identifier;
   accessing, based at least on the identifier, the software container repository to inspect the cloned disk for a cybersecurity object, wherein the inspection comprises inspecting each layer of a plurality of layers of the first software container;
   detecting the cybersecurity object on the cloned disk;
   detecting a cybersecurity threat based on the detection of the cybersecurity object;
   detecting in the cloud computing environment a second software container deployed based on the base image; and
   initiating a mitigation action for the first software container and the second software container, in response to the detection of the cybersecurity threat.

2. The method of claim 1, further comprising: inspecting the generated cloned disk to detect the first software container.

3. The method of claim 1, further comprising: detecting the disk in the cloud computing environment, wherein the disk is associated with a workload.

4. The method of claim 1, further comprising:
   detecting the base image of the first software container in a repository;
   releasing the generated cloned disk; and
   inspecting the base image of the first software container from the repository for the cybersecurity object.

5. The method of claim 4, further comprising:
   initiating a second mitigation action in response to detecting the cybersecurity object on the base image in the repository.

6. The method of claim 1, wherein the mitigation action includes any one of: revoking access to the first software container, revoking access from the first software container, generating an alert, updating an alert, generating a severity score, updating a severity score, and any combination thereof.

7. The method of claim 1, further comprising: releasing a resource allocated to the generated cloned disk, in response to determining that the inspection is completed.

8. A non-transitory computer-readable medium storing a set of instructions for inspecting a running container for a cybersecurity object in a cloud computing environment, the set of instructions comprising:
one or more instructions that, when executed by one or more processors of a device, cause the device to:
generate a clone of a disk, wherein the disk is deployed in a cloud computing environment, wherein the disk comprises a base image;
detect a first software container identifier of a first software container on the generated cloned disk, wherein the first software container is a running container;
determine a location of a software container repository based on the identifier;
access, based at least on the identifier, the software container repository to inspect the cloned disk for a cybersecurity object, wherein the inspection comprises inspecting each layer of a plurality of layers of the first software container;
detect the cybersecurity object on the cloned disk;
detect a cybersecurity threat based on the detection of the cybersecurity object;
detect in the cloud computing environment a second software container deployed based on the base image; and
initiate a mitigation action for the first software container and the second software container, in response to the detection of the cybersecurity threat.

9. A system for inspecting a running container for a cybersecurity object in a cloud computing environment comprising:
a processing circuitry; and a memory, the memory containing instructions that, when executed by the processing circuitry, configure the system to:
generate a clone of a disk, wherein the disk is deployed in a cloud computing environment, wherein the disk comprises a base image;
detect a first software container identifier of a first software container on the generated cloned disk, wherein the first software container is a running container;
determine a location of a software container repository based on the identifier;
access, based at least on the identifier, the software container repository to inspect the cloned disk for a cybersecurity object, wherein the inspection comprises inspecting each layer of a plurality of layers of the first software container;
detect the cybersecurity object on the cloned disk;
detect a cybersecurity threat based on the detection of the cybersecurity object;
detect in the cloud computing environment a second software container deployed based on the base image; and
initiate a mitigation action for the first software container and the second software container, in response to the detection of the cybersecurity threat.

10. The system of claim 9, wherein the memory contains further instructions which when executed by the processing circuitry further configure the system to:
inspect the generated cloned disk to detect the first software container.

11. The system of claim 9, wherein the memory contains further instructions which when executed by the processing circuitry further configure the system to:
detect the disk in the cloud computing environment, wherein the disk is associated with a workload.

12. The system of claim 9, wherein the memory contains further instructions which when executed by the processing circuitry further configure the system to:
detect the base image of the first software container in a repository;
releasing the generated cloned disk; and
inspect the base image of the first software container from the repository for the cybersecurity object.

13. The system of claim 12, wherein the memory contains further instructions which when executed by the processing circuitry further configure the system to:
initiate a second mitigation action in response to detecting the cybersecurity object on the base image in the repository.

14. The system of claim 9, wherein the mitigation action includes any one of: revoking access to the first software container, revoking access from the first software container, generating an alert, updating an alert, generating a severity score, updating a severity score, and any combination thereof.

15. The system of claim 9, wherein the memory contains further instructions which when executed by the processing circuitry further configure the system to:
release a resource allocated to the generated cloned disk, in response to determining that the inspection is completed.

* * * * *